United States Patent Office 2,834,228
Patented May 13, 1958

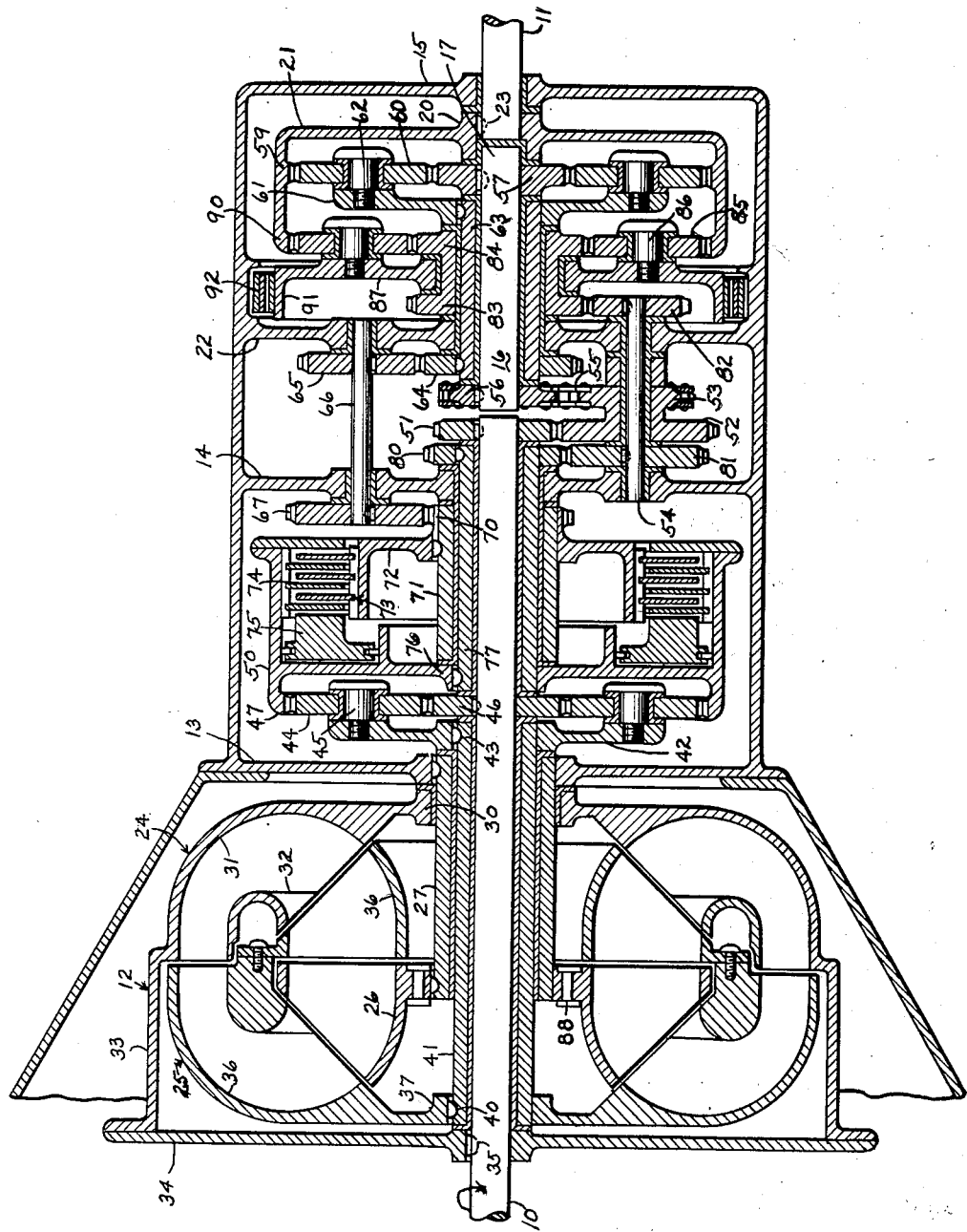

---

2,834,228

TURBO-MECHANICAL TRANSMISSION

Charles I. Place, Middletown, Conn.

Application February 23, 1954, Serial No. 411,754

14 Claims. (Cl. 74—688)

This invention relates to improvements in a turbo-mechanical transmission, and more particularly to a power transmission of this type which is fully automatic, and provides variable speeds in one progressive and stepless range, the transmission being adapted for use in many fields, but being particularly adapted for use in automotive vehicles.

Certain of the features of the present transmission are disclosed and claimed in a copending application of this applicant, bearing Serial No. 164,932, filed May 29, 1950, now Patent No. 2,674,137, of which the present application is a continuation-in-part.

The instant turbo-mechanical transmission provides at least two lines of power transmission between the input and output shafts, so that the resultant speed and torque drive of the output shaft varies automatically and smoothly in stepless manner in response to variations of power applied to the input shaft, and of load on the output shaft. Briefly stated, the arrangement consists of a differential gearing having at least two mutually cooperative gear trains between the input and output shafts, and a fluid turbine having its impeller connected in driven relation with the input shaft and operatively connected to one of the gear trains, the turbine input member being in connection with the input shaft and an element of the other gear train.

It is an important objective to realize a fully automatic transmission in which changes in power input to the transmission and loading of the transmission output produces speed and torque variation of stepless character, and hence avoid objectionable control mechanisms such as gear-shifts, brakes and other extraneous operator-actuated controls for effecting operative connection of elements of the transmission to realize speed and torque changes.

Another important object realized, is the development of a speed and torque drive that balances the power input and the load imposed on the transmission, the transmission automatically established a drive balance appropriate to changed conditions. It will be noted that multiple torque drive obtains automatically in all speeds when the demand occurs. Any unbalance between torque input and torque demand will autocatically cause the production of cultiple torque in the transmission system.

Still another important objective is to provide an automatic transmission which produces speeds of the output shaft from zero to and including overdrive in one progressive and stepless range. The overdrive feature is obtained under minimum torque requirement, and occurs as a normal function without the need of any control mechanism such as heretofore necessary to overdrive operation in prior so-called automatic transmissions.

Yet another important object is to provide an improved reverse drive in the transmission which utilizes a differential gearing and fluid turbine arrangement serving automatically to produce multiple torque at all speeds, and to realize a reverse speed and torque variation of stepless character.

Numerous other objects and advantages of this invention wil more clearly appear from the detailed description of a presently preferred embodiment, particularly when considered in connection with the accompanying drawing, in which the single figure is a longitudinal sectional elevation o fthe improved transmission.

Referring now by characters of reference to the drawing, the improved transmission includes a driving or power input shaft 10, a driven or power output shaft 11, a fluid unit generally indicated at 12, and differential gearing, hereinafter described, interconnecting the input and output shaftst. In the preferred arrangement, the shafts 10 and 11 are disposed in substantially axial alignment. The input shaft 10 is journalled in transmission frame plates 13 and 14, while output shaft 11 is journalled in a bearing in casing wall 15.

Located axially between input and output shafts 10 and 11, and extending centrally of the transmission assembly, is a shaft 16. One end 17 of shaft 16 is journalled in hub 20 of a drum-like member 21, and is further supported by a transmission frame plate 22. The hub 20 of member 21 is mounted on and connected to output shaft 11 by key element 23.

The input shaft 10 provides an operative support for the fluid unit 12 which may be of well known type suitable to the present transmission, the turbine comprising a driving or impeller structure referred to at 24, a driven structure referred to at 25 and a reactor 26, the reactor 26 including a hub 27. Impeller structure 24 provides a hub 30 freely journalled on reactor hub 27, and a casing 31 which houses impeller blades 32. The casing 31 provides an extension 33 at its open side to which is secured a closure plate 34, the plate 34 and casing 31 being adapted to rotate with shaft 10 to afford a drive connection between shaft 10 and impeller blades 32.

The driven structure 25 of the unit includes a frame 36 having a hub 37, the hub 37 being secured by key 40 to a sleeve 41 freely journalled on shaft 10. A planet-carrier 42 is fastened to sleeve 41 by key 43, and is adapted to support as a rotative mounting, planet gears 44, the gears 44 being secured by stub shaft elements 45. Engaging planet gears 44 is a sun gear 46 fixed to input shaft 10, and an internal ring gear 47 this is formed as an integral part of a clutch drum referred to at 50.

Another gear element 51 is secured to or keyed on the end of input shaft 10, and meshes with a dual idler gear and chain sprocket 52—53 which is rotatably mounted on jack shaft 54. The chain sprocket 53 engages a chain 55, the chain 55 being also operatively connected to sprocket 56 secured to the end of shaft 16. Of course, while a drive chain connection is shown, as preferred, between idler 52—53 and shaft 16, it will be readily apparent that an equivalent gearing may be utilized. Thus, the chain drive is to be considered as an element of the presently described gear train of the differential gearing.

Secured to the opposite end of shaft 16 is a sun gear 57 that engages planet gears 60, the planet gears 60 being attached to planet carrier 61 by stub shafts 62. The planet gears 60 also engage an internal ring gear 59 carried by the drum-like member 21 connected to shaft 11. The hub of planet carrier 61 is keyed to one end of tubular sleeve element 63, the latter being rotatably mounted on shaft 16. On the other end of sleeve element 63 is secured a gear 64 that meshes with gear 65 attached to jack shaft 66. It will be noted that the jack shaft 66 is journalled in frame plates 14 and 22. Another gear 67 is secured to shaft 66, and is adapted to engage gear 70 provided on tubular sleeve 71 rotatively mounted about shaft 10. Further, a cooperating clutch drum 72 is fastened to sleeve 71.

Operatively mounted between drum 50 and drum 72 is a multiple disc clutch referred to at 73, the clutch including discs 74 and an operating piston 75. The operating means for moving piston 75 into and out of engagement with discs 74 is not shown, but may be of any conventional type, either hydraulic or mechanical. This clutch 73 is considered to be an element of the second gear train of the differential gearing connecting shafts 10 and 11.

The hub 76 of clutch drum 50 is secured to one end of another sleeve 77 rotatively mounted on shaft 10, and located underneath sleeve 71 and frame plate 14. A gear element 80 is fastened to the other end of sleeve 77, the gear element 80 meshing with gear 81 secured to jack shaft 54. Another spur gear 82 is attached to shaft 54, and engages gear 83 of double gear 83—84 rotatively mounted on sleeve 63. The gear 84 enmeshes planet gears 85, and the latter are secured by stub shafts 86 to planet carrier 87, the carrier 87 being rotatively mounted between and on double gear 83—84. The planet gears 85 engage another internal ring gear 90 of drum-like member 21. The outer periphery of carrier 87 is provided with a brake drum flange 91 that is adapted to receive a brake band 92.

To control the turbine reactor 26 so as to prevent reverse rotation during operation of the fluid unit as a torque-converter, and to permit the reactor to float with the impeller and driven members of the fluid unit when the fluid unit acts as a coupling, the reactor 26 is provided with a built-in one-way brake 88 having a hub keyed or secured to hub 27, the hub 27 being keyed or secured to frame plate 13.

In the operation of the transmission, all gear ratios may be varied to suit the application of the principles involved, to the particular field of use in which this transmission system is to be utilized. To facilitate an understanding, let it be assumed solely for example and without restriction, that in the embodiment disclosed, the gear ratios are as follows: A gear ratio of one to one obtains between sun gears 46, 57 and the respective planet gears 44, 60; also between sprockets 53 and 56; likewise between gears 67 and 70, and between gears 80 and 81. Further, a gear ratio of one to three obtains in respect to planet gears 44, 60 and the respective internal ring gears 47, 59.

Let it be assumed further that input shaft 10 is driven from a power source such as an internal combustion engine having a relatively wide speed range, as for example a low idling speed of 1200 R. P. M. through a normal operating speed of about 2400 R. P. M., and that the output shaft 11 is conected to a load such as the driving wheels of an automotive vehicle. For convenience in the following description, the abbreviation cw. will be employed to denote clockwise rotation and ccw. to denote counterclockwise rotation.

With the multiple disc clutch 73 and the brake band 92 in inoperative positions, the system is in "neutral" and the output shaft will remain at rest under load. Now, with the engine idling and rotating input shaft 10 say at 1200 R. P. M. and cw. as shown by the arrow, it will be noted that spur gear 51, rotating cw. at 1200 R. P. M., turns gear 52 ccw. and at 900 R. P. M. (the ratio of gear 51 to gear 52 being three to four). Sprocket 53 is carried by gear 52, and operates to drive sprocket 56 and shaft 16 ccw. at 900 R. P. M., and hence rotates sun gear 57 at 900 R. P. M. and ccw. Since ring gear 59 attached to output shaft 11 is at rest, planet gears 60 will walk inside of drum-like member 21, and hence the carrier 61 will rotate at 225 R. P. M. and ccw. (the ratio of epicyclic gearing here being three to one).

Sleeve 63 fastened to carrier 61 will turn gear 64 at 225 R. P. M. and ccw., and consequently gear 64 will revolve gear 65, attached shaft 66, and gear 67, each at 300 R. P. M. and cw., the ratio of gears 64 and 65 being four to three. Gear 67 enmeshes gear 70 of sleeve 71, and turns the clutch drum 72 at 300 R. P. M. and ccw. Since the multiple disc clutch 73 is now inoperative, it follows that the ccw. rotation of drum 72 will have no effect on drum 50.

In addition, the input shaft 10 drives sun gear 46 and impeller 24 in cw. direction. Rotation of impeller 24 imparts energy to the fluid in the torque converter, and results in cw. drive of driven member 25. It follows that the sleeve 41 connected to driven member 25 and the planet carrier 42 are also driven or tending to be driven cw. As a result, the clutch drum 50 will be driven cw. In accordance with the previous assumption that clutch 73 is open, there is no connection between drums 50 and 72, and since brake band 92 is also inoperative, the system as a whole is inoperative or in "neutral."

To condition the transmission for forward drive, let it be assumed that input shaft 10 is driven at idling speed by the engine; that a load is on the output shaft 11 sufficient to hold shaft 11 at rest under idling condition, and that clutch drum 50 is operatively connected to drum 72 by disc clutch 73. Since under idling speeds the energy generated by impeller 24 is not sufficient to drive driven member 25 against the load on output shaft 11, it will be apparent that the planet gears 44 will float, i. e., revolve on their axes (shafts 45). Since drum 50, and hence ring gear 47 will rotate ccw. at 300 R. P. M., while sun gear 46 will rotate cw. at idling speed, for example at 1200 R. P. M., it follows that carrier 42 will rotate as a resultant speed that closely approaches zero. Actually, under the assumed gear ratios the carrier 42 will have a slight cw. rotation which results in less drag or tendency to creep when the vehicle is at rest.

Upon acceleration of the engine toward the indicated normal operating speed of 2400 R. P. M., the turbine driven member 25 is rotated cw., the fluid drive being aided by reverse flow produced by reactor 26. The carrier 42 rotating cw. with driven member 25, will cause planet gears 44 to drive ring gear 47. Since under idling condition, the ring gear 47 rotates ccw., it will be noted that with cw. rotation of sun gear 46 and cw. acceleration of carrier 42, the ring gear 47 will decelerate to zero speed, and thence accelerate in a cw. direction. The planet carrier 61 being connected to ring gear 47 through clutch 73, will follow the acceleration and deceleration of ring gear 47. The effect of carrier 61 on output shaft 11 through planet gears 60 will be later described. The above described combined engine and turbine drive of carrier 61 constitutes one line of power transmission in the assembly.

A second cooperating drive involves gear element 51 driven by input shaft 10, and sun gear 57 carried by shaft 16. As the turbine driven member accelerates from rest, resulting in a deceleration of carrier 61 to zero speed and thence acceleration in a cw. direction as indicated above, the sun gear 57 is effective through planet gears 60 on carrier 61, to drive ring gear 59. When the speed of carrier 61 is zero, the speed of ring gear 59 is one-third the speed of sun gear 57 and cw. because of the ccw. rotation of sun gear 57. Thus, the output shaft 11 to which ring gear 59 is connected, is rotated in a cw. direction.

The ultimate speed is attained when clutch drums 50—72, the carrier 42, and sun gear 46 reach a substantially unified forward or cw. drive. Because of the three to four ratio of gears 65 and 64, the ultimate speed of carrier 61 will be three-fourths the speed of shaft 10 and cw., and since the speed of sun gear 57 will be three-fourths the speed of input shaft 10 and ccw., the ultimate speed of output shaft 11 will be one and one-third that of the input shaft speed and cw. This important overdrive feature is of great advantage where the transmission is used in automotive vehicles. It is apparent that the speed and torque characteristics, as well as the extent of overdrive, may be determined through appropriate selection of gear ratios.

Upon deceleration of input shaft 10, the reverse of the above described function takes place, and again the rate and extent of speed change in carrier 61 depend on the loading. With a constant given speed of input shaft 10, any change in the load imposed on output shaft 11 will cause the mechanism to operate in the manner above indicated. While transmitting power from input shaft 10 to output shaft 11, the transmission automatically adjusts the relative cooperation of the two lines of power flow through the transmission to the altered conditions at either one or both of shafts 10 and 11. Assuming normal operation of the system within its load capacity, such adjustments serve to effect a balanced drive, i. e., to provide a speed and torque output conforming to the requirements of the load imposed on output shaft 11. In all cases the transmission adjustments occur smoothly and in a stepless manner.

The transmission assembly produces an operating balance between the input torque and the load imposed on output shaft 11. Upon any change in the speed and torque of input shaft 10 and/or in the load on output shaft 11, the transmission gearing responds by corresponding adjustments of the cooperating lines of power flow therein, to attain such balanced drive.

To obtain reverse drive, the transmission system is first placed in "neutral" by releasing clutch 73, and then brake band 92 is applied to brake drum 91. With clutch 73 and brake band 92 in the denoted reverse position, any increase of speed of input shaft 10 will cause impeller 24 to drive turbine driven member 25, and hence revolve carrier 42 in a cw. direction. The coaction of planet gears 44 with sun gear 46, rotating cw., results in clutch drum 50 being turned cw. Tubular sleeve 77 attached to drum 50 and gear 80 is turned cw., the gear 80 enmeshing gear 81 on shaft 54 to rotate the shaft 54 ccw. Gear 82 on shaft 54 engagfes gear 83 and acts to turn double gear 83—84 in a cw. direction. Since carrier 87 is now retained by brake band 92, gear 84 acts with planet gears 85 to rotate ring gear 90, and hence drum-like member 21 and attached output shaft 11 in a ccw. or reverse direction.

Actuation of brake band 92 may be realized through any suitable control means (not shown) actuated by the vehicle operator. This reverse mechanism constitutes a braking provision that may be utilized under emergency conditions. By releasing the clutch 73 and applying brake band 92 to drum 91 while the vehicle is in forward motion, the output shaft 11 operates to drive ring gear 90 in a cw. direction, the ring gear 90 driving double gear 83—84 at a greater speed and ccw. Following this gear train from 83—84 to 82—81 to gear 80 to ring gear 47, it will appear that ring gear 47 is driven ccw. at high speed. At the same time, sun gear 46 is driven cw. at engine speed. Planet gears 44 engaging sun gear 46 and ring gear 47 will cause ccw. rotation of carrier 42. It is now apparent that turbine member 25 is now rotated ccw., and tends to resist the drive of impeller 24, thus using the engine as a brake to slow down or stop the forward motion of the vehicle.

Although the improvements have been described by making particularized reference to a single preferred emodiment, the detail of description is not to be understood as restrictive, numerous variants being possible within the principles disclosed, and within the fair scope of the claims hereunto appended.

I claim as my invention:

1. A transmission interconnecting driving and driven shafts comprising a fluid unit having driving and driven members, an operative connection between the driving shaft an dsaid driving member, a differential gearing providing a terminal gear connected to the driven shaft, including a sun gear, and including a planet gear means having a planet carrier and planet gears engaging said sun gear and said terminal gear, a gear element drive connected to said driving shaft, means operatively connecting the gear element to said sun gear, a second sun gear drive connected to the driving shaft, a ring gear rotatively carried on said driving shaft, a second planet gear means including a second carrier drive connected to said driven member and including second planet gears engaging said second sun gear and said ring gear, means operatively interconnecting said ring gear to said first planet carrier of the differential gearing.

2. A transmission interconnecting driving and driven shafts comprising a fluid unit having driving and driven members, an operative connection between the driving shaft and said driving member, a gear element drive connected to said driving shaft, differential gearing including a terminal gear drive connected to the driven shaft, including a sun gear, and including a planet gear means having a carrier and planet gears, said planet gears engaging said sun gear and said terminal gear, a gear train operatively connecting said gear element to said sun gear, a second gear element drive connected to said driving shaft, a ring gear rotatively mounted on said driving shaft, a second gear train operatively connecting said ring gear to said planet carrier, a second planet gear means having a planet carrier drive connected to said driven member of the fluid unit and having planet gears engaging said second gear element and said ring gear.

3. A transmission interconnecting driving and driven shafts comprising a fluid unit having driving and driven members, a drive connecting between said driving shaft and said driving member, a gear element drive connected by said driving shaft, differential gearing including a sun gear, including a terminal gear connected to the driven shaft, and including planet gear means having a planet carrier and planet gears engaging said sun gear and said terminal gear, a gear train operatively connecting said gear element to said sun gear, a second gear element drive connected to said driving shaft, a ring gear rotatively mounted on said driving shaft, a second planet gear means having a second planet carrier drive connected to said driven member and having second planet gears engaging said second gear element and said ring gear, means including a clutch operatively connecting said ring gear and the first said planet carrier of the differential gearing.

4. A transmission interconnecting driving and driven shafts comprising a fluid unit having driving and driven members, a drive connection between said drive shaft and said driving member, a gear element drive connected to said driving shaft, differential gearing including a terminal gear connected to the driven shaft, including a sun gear, and including a planet gear means having a planet carrier and planet gears engaging said terminal gear and said sun gear, means operatively connecting said gear element to said sun gear, a second sun gear drive connected to said driving shaft, a ring gear rotatively mounted on said driving shaft, a second planet gear means including a second planet carrier drive connected to said driven member and including second planet gears engaging said second sun gear and said ring gear, and means operatively connecting said ring gear to said first planet carrier of the differential gearing, the last said means including a gear rotatively mounted on said driving shaft and including a clutch connecting the last said gear to said ring gear.

5. A transmission interconnecting driving and driven shafts comprising a fluid unit having driving and driven members, drive connection between said driving shaft and said driving member, a gear element drive connected to said driving shaft, differential gearing including a ring gear drive connected to said driven shaft, including a sun gear, and including a planet gear means having a planet carrier and planet gears engaging said sun gear and said ring gear, a gear train operatively connecting said gear element to said sun gear, a second gear element drive connected to said driving shaft, a second ring gear rotatively mounted on said driving shaft, a second planet gear means having a second planet carrier drive connected to said driven member, and having second planet gears engaging said second gear element and said second ring gear, a second gear train operatively connecting the second ring gear to said first planet carrier, said second gear train including a gear rotatively mounted on said driving shaft and including a clutch means operatively interconnecting said second ring gear and said rotatable gear of said second gear train.

6. A transmission interconnecting driving and driven shafts comprising a fluid unit having driving and driven members, a drive connection between said driving shaft and said driving member, differential gearing including a terminal gear drive connected to the driven shaft, including a shaft element arranged longitudinally of the transmission, including a sun gear drive connected to said shaft element, and including planet gear means having a planet carrier and planet gears engaging said sun gear and said terminal gear, a gear element drive connected to said driving shaft, a gear train operatively connecting said gear element to said shaft element, a second gear element drive connected to said driving shaft, a second planet gear means having a second planet carrier drive connected to said driven member of the fluid unit and having second planet gears engaging said second gear element, and a second gear train operatively connecting the said second planet gears to said first planet carrier of the differential gearing.

7. A transmission interconnecting driving and driven shafts comprising a fluid unit having driving and driven members, a drive connection between said driving shaft and said driving member, differential gearing including a shaft element arranged longitudinally of the transmission, including a sun gear drive connected to said shaft element, including a ring gear connected to said driven shaft, and including a planet gear means having a planet carrier and planet gears engaging said sun gear and said ring gear, a gear element drive connected to said driving shaft, a gear train operatively interconnecting said gear element to said shaft element, a second gear element drive connected to said driving shaft, a second ring gear rotatively mounted on said driving shaft, a second planet gear means having a second planet carrier drive connected to said driven member and having second planet gears engaging said second gear element and said second ring gear, and a second gear train operatively connecting the said second ring gear to the said first planet carrier of said differential gearing.

8. A transmission interconnecting driving and driven shafts comprising a fluid unit having driving and driven members, a drive connection between said driving shaft and said driving member, differential gearing including a shaft element arranged longitudinally of the transmission, including a sun gear drive connected to said shaft element, including a ring gear connected to said driven shaft, and including planet gear means having a planet carrier and planet gears engaging said sun gear and said ring gear, a gear element drive connected to said driving shaft, a gear train operatively connecting said gear element to said shaft element, a second gear element drive connected to said driving shaft, gear means drive connected to said driven member and operatively engaging said second gear element, a second gear train operatively connecting said gear means to said planet carrier, said planet carrier being rotatively mounted on said shaft element.

9. A transmission interconnecting driving and driven shafts comprising a fluid unit having driving and driven members, a drive connection between said driving shaft and said driving member, differential gearing including a shaft element arranged longitudinally of the transmission, including a sun gear drive connected to said shaft element, a ring gear connected to said driven shaft, and including planet gear means having a planet carrier rotatively mounted on said shaft element and having planet gears engaging said sun gear and said ring gear, a gear element drive connected to said driving shaft, a gear train operatively connecting said gear element to said shaft element, a second gear element drive connected to said driving shaft, a second ring gear rotatively mounted on said driving shaft, a second planet gear means having a second planet carrier drive connected to said driven member and having second planet gears engaging said second gear element and said second ring gear, and a second gear train operatively connecting said second ring gear to the first said planet carrier.

10. A transmission interconnecting driving and driven shafts comprising a fluid unit having driving and driven members, a drive connection between said driving shaft and said driving member, differential gearing including a shaft element arranged longitudinally of said transmission, including a sun gear drive connected to said shaft element, including a ring gear connected to said driven shaft, and including a planet gear means havig a planet carrier rotatively mounted on said shaft element and having planet gears engaging said sun gear and said ring gear, a gear element drive connected to said shaft element, a gear train operatively connecting said gear element to said shaft element, a second gear element drive connected to said driving shaft, a second ring gear rotatively mounted on said driving shaft, a second planet gear means having a second planet carrier drive connected to said driven member and having second planet gears engaging said second gear element and said second ring gear, a gear means rotatively mounted on said driving shaft, clutch means operatively connecting said second ring gear to said gear means, and a second gear train operatively connecting said gear means to said first planet carrier.

11. A transmission interconnecting driving and driven shafts comprising a fluid unit having driving and driven members, a drive connection between said driving shaft and sad driving members, differential gearing including a terminal gear connected to said driven shaft, including a shaft element arranged longitudinally of said transmission, including a sun gear drive connected to said shaft element, and including planet gear means having a planet carrier and having planet gears engagig said su gear and said terminal gear, a gear element drive connected to said driving shaft, a gear train operatively connecting said gear element to said sun gear, gear means operatively connected to said driven member of the fluid unit, a second gear element drive connected to said driving shaft, said second gear element being operatively connected to said gear means, a second gear train operatively connecting the gear means to said planet carrier.

12. A transmission interconnecting driving and driven shafts comprising a fluid unit having driving and driven members, a drive connection between said driving shaft and said driving member, dfferential gearing including a shaft element arranged longitudinally of said transmission, including a sun gear drive connected to said shaft element, including a ring gear connected to said driven shaft, and including planet gear means having a planet carrier rotatively mounted on said shaft element, and having planet gears engaging said sun gear and said ring gear, a gear element drive connected to said driving shaft, a gear train operatively connecting said gear element to said sun gear, a second gear element drive connected to said driving shaft, and a second gear train operatively connecting said planet carrier to said second gear element and to said driven member of the fluid unit.

13. A transmission interconnecting driving and driven shafts, comprising a fluid unit having driving and driven members, a drive connection between said driving shaft and said driving member, differential gearing including a shaft element arranged longituidnally of said transmission, including a sun gear rotatively mounted on said shaft element, including a ring gear connected to said driven shaft, and including a planet gear means having a planet carrier rotatively mounted on said shaft element and having planet gears engaging said sun gear and said ring gear, a gear element drive connected to said driving shaft, a second ring gear rotatively mounted on said driving shaft, a second planet gear means having a second planet carrier drive connected to said driven member and having second planet gears engaging said gear element and said second ring gear, a gear train operatively connecting the second ring gear to said sun gear, and brake means connected to said first planet carrier to prevent selectively rotation of said carrier about said shaft element.

14. A transmission interconnecting driving and driven shafts comprising a fluid unit having driving and driven members, a drive connection between said driving shaft and said driving member, differential gearing including a shaft element arranged longitudinally of said transmission, including a sun gear drive connected to said shaft element, including a ring gear connected to said driven member, and including a planet gear means having a planet carrier and having planet gears engaging said sun gear and said ring gear, a gear element drive connected to said driving shaft, means operatively connecting said gear element to said shaft element, a second gear element drive connected to said driving shaft, a second ring gear rotatively mounted on said driving shaft, a second planet gear means having a second planet carrier drive connected to said driven member of the fluid unit and having second planet gears engaging said second gear element and said second ring gear, means operatively connecting said second ring gear to said first planet carrier, a second sun gear rotatively mounted on said shaft element, means operatively connecting said second ring gear to said second sun gear, a third ring gear fixed to said first ring gear and rotatable therewith, a third planet gear means having a third planet carrier rotatively mounted on said shaft element and having third planet gears engaging said second sun gear and said third ring gear, and braking means operatively connected to said third planet carrier to prevent selectively rotation of said carrier.

References Cited in the file of this patent

UNITED STATES PATENTS

| | | |
|---|---|---|
| 2,329,733 | Watson | Sept. 21, 1943 |
| 2,368,865 | Murray | Feb. 6, 1945 |
| 2,523,619 | Grebb | Sept. 26, 1950 |
| 2,605,652 | Kelbel | Aug. 5, 1952 |
| 2,674,137 | Place | Apr. 6, 1954 |